(12) United States Patent
Chiba et al.

(10) Patent No.: US 6,711,382 B2
(45) Date of Patent: Mar. 23, 2004

(54) MOBILE COMMUNICATION SYSTEM AND COMMUNICATION METHOD PERFORMED IN THE SYSTEM

(75) Inventors: Isamu Chiba, Tokyo (JP); Shuji Urasaki, Tokyo (JP); Yoshitaka Hara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 483 days.

(21) Appl. No.: 09/739,781

(22) Filed: Dec. 20, 2000

(65) Prior Publication Data

US 2002/0077153 A1 Jun. 20, 2002

(51) Int. Cl.⁷ .............................. H04B 1/10; H04B 15/00
(52) U.S. Cl. ...................... 455/63.4; 455/25; 455/562.1; 455/277.2
(58) Field of Search ................................ 455/63.4, 63.1, 455/25, 562.1, 278.1, 277.1, 277.2, 69, 279.1, 561, 272

(56) References Cited

U.S. PATENT DOCUMENTS 6,049,310 A * 4/2000 Sadahiro ...................... 343/702
6,271,798 B1 * 8/2001 Endo et al. .................. 343/713
6,430,215 B1 * 8/2002 Kinoshita et al. ........... 455/273
6,473,055 B2 * 10/2002 Kohno et al. ................ 343/853
6,498,939 B1 * 12/2002 Thomas ..................... 455/562.1

FOREIGN PATENT DOCUMENTS

JP          9-219615          8/1997

\* cited by examiner

*Primary Examiner*—Nay Maung
*Assistant Examiner*—John J Lee
(74) *Attorney, Agent, or Firm*—Oblon, Spivak, McClelland, Maier & Neustadt, P.C.

(57) ABSTRACT

A directivity control of an adaptive antenna is performed for an antenna of a base station when a signal is received in the antenna of the base station, and the directivity control of the adaptive antenna is performed for an antenna of a mobile station when a signal is received in the antenna of the mobile station. Therefore, even though an antenna of a second mobile station functions as an interference wave source, the reception of an interference wave from the interference wave source can be prevented in both the antenna of the base station and the antenna of the mobile station, and a communication quality in both the base station and the mobile station can be maintained in the communication between the base station and the mobile station.

3 Claims, 6 Drawing Sheets

MOBILE STATION : RECEPTION
BASE STATION : TRANSMISSION

MOBILE STATION : TRANSMISSION
BASE STATION : RECEPTION

MOBILE STATION : RECEPTION
BASE STATION : TRANSMISSION

MOBILE STATION : TRANSMISSION
BASE STATION : RECEPTION

MOBILE STATION : RECEPTION
BASE STATION : TRANSMISSION

MOBILE STATION : TRANSMISSION
BASE STATION : RECEPTION

MOBILE STATION : RECEPTION
BASE STATION : TRANSMISSION

MOBILE STATION : TRANSMISSION
BASE STATION : RECEPTION

MOBILE STATION : RECEPTION
BASE STATION : TRANSMISSION

MOBILE STATION : TRANSMISSION
BASE STATION : RECEPTION

MOBILE STATION : RECEPTION
BASE STATION : TRANSMISSION

MOBILE COMMUNICATION SYSTEM AND COMMUNICATION METHOD PERFORMED IN THE SYSTEM

BACKGROUND OF THE INVENTION

1. Field of the Invention

The present invention relates to a mobile communication system and a communication method performed in the mobile communication system in which a radiation pattern of a signal output from an antenna of a base station and a radiation pattern of a signal output from an antenna of a mobile station such as a portable telephone or a portable information terminal are controlled in a communication between the base station and the mobile station to improve a communication quality in both the base station and the mobile station.

2. Description of Related Art

FIG. 7 is an explanatory view showing a signal transmission from a mobile station to a base station in a conventional mobile communication system, for example, disclosed in Published Unexamined Japanese Patent Application H9-219615 (1997), and FIG. 8 is an explanatory view showing the reception of a signal output from a base station in a mobile station in the conventional mobile communication system. In FIG. 7 and FIG. 8, 1 indicates an antenna of a base station. A directivity control of an adaptive antenna is performed for the antenna 1 of the base station in signal transmission and reception operations of the base station. 2 indicates an antenna of a mobile station such as a portable telephone or a portable information terminal. 3 indicates an interference wave source for reflecting a transmission wave output from the antenna 1 of the base station and a transmission wave output from the antenna 2 of the mobile station. R1 denotes a space distribution indicating a radiation characteristic of the antenna 1 of the base station for a signal received in the antenna 1 of the base station. T2 denotes a space distribution indicating a radiation characteristic of the antenna 1 of the base station for a signal transmitted from the antenna 1 of the base station. T1 denotes a space distribution indicating a radiation characteristic of the antenna 2 of the mobile station for a signal transmitted from the antenna 2 of the mobile station. R2 denotes a space distribution indicating a radiation characteristic of the antenna 2 of the mobile station for a signal received in the antenna 2 of the mobile station.

Next, an operation is described.

As shown in FIG. 7, in a signal transmission operation in which a desired signal is transmitted from the mobile station to the base station, a transmission directivity inherently held in the antenna 2 of the mobile station is used in the mobile station as it is. That is, a space distribution T1 indicating a radiation characteristic of the antenna 2 is determined according to the transmission directivity. Therefore, a signal is transmitted from the antenna 2 of the mobile station according to the space distribution T1. In this case, because the space distribution T1 is uniform in all directions, the signal is equally transmitted in all directions.

In contrast, as shown in FIG. 7, a directivity control of an adaptive antenna is performed for the antenna 1 of the base station to form a space distribution R1, which indicates a radiation characteristic of the antenna 1 for a signal received in the antenna 1 of the base station, as a reception directivity. In this space distribution R1 denoting the reception directivity of the antenna 1, a main beam of the antenna 1 is directed in a desired signal coming direction to receive a desired signal directly coming from the mobile station, and the reception directivity toward the interference wave source 3 is set to zero in cases where a reflected wave is transmitted from the interference wave source 3. Therefore, even though a reflected wave output from the interference wave source 3 comes as an interference wave to the antenna 1 of the base station, the reception of the interference wave in the antenna 1 can be prevented according to the space distribution R1 of the radiation characteristic of the antenna 1, and a desired signal directly coming from the mobile station is received in the antenna 1 at a prescribed communication quality.

Also, as shown in FIG. 8, in a signal transmission operation in which a desired signal is transmitted from the base station to the mobile station, a directivity control of an adaptive antenna is performed for the antenna 1 of the base station to form a space distribution T2, which indicates a radiation characteristic of the antenna 1 for a signal transmitted from the antenna 1 of the base station, as a transmission directivity. The space distribution T2 denoting the transmission directivity of the antenna 1 is determined by multiplying the space distribution R1, which indicates the reception directivity of the antenna 1, by an assumed weighting factor. Therefore, in this space distribution T2 of the radiation characteristic of the antenna 1, a main beam of the antenna 1 is directed in a desired signal transmitting direction to directly transmit a desired signal to the mobile station, and the transmission directivity toward the interference wave source 3 is set to zero. Therefore, no signal is output from the antenna 1 of the base station to the interference wave source 3 according to the space distribution T2 of the radiation characteristic of the antenna 1, and no reflected wave is output from the interference wave source 3.

In contrast, as shown in FIG. 8, in the antenna 2 of the mobile station, a reception directivity inherently held in the antenna 2 of the mobile station is used in the mobile station as it is, and a space distribution R2 of a radiation characteristic of the antenna 2 is determined according to the reception directivity. Therefore, a desired signal directly transmitted from the antenna 1 of the base station is received in the antenna 2 of the mobile station according to the space distribution R2. In this case, because the space distribution R2 is uniform in all directions, signals arriving from all directions are equally received in the antenna 2 of the mobile station.

As is described above, in the conventional mobile communication system shown in FIG. 7 and FIG. 8, the directivity control of the adaptive antenna is performed for the antenna 1 of the base station in the signal transmission and reception operations. Therefore, the reception of the interference wave, which is output from the interference wave source 3, in the antenna 1 of the base station and the antenna 2 of the mobile station can be prevented, and a communication quality in the signal transmission and reception operations can be improved.

Next, a case that a problem occurs in the conventional mobile communication system is described.

FIG. 9A is another explanatory view showing a signal transmission from a mobile station to a base station in the conventional mobile communication system shown in FIG. 7 and FIG. 8, and FIG. 9B is another explanatory view showing the reception of a signal output from a base station in a mobile station in the conventional mobile communication system shown in FIG. 7 and FIG. 8. In FIG. 9A and FIG. 9B, 4 indicates an interference wave source denoted by an antenna of a second mobile station such as a portable telephone or a portable information terminal.

As shown in FIG. 9A, in the signal transmission from the mobile station to the base station, the directivity control of the adaptive antenna is performed for the antenna 1 of the base station to form the space distribution R1, which indicates the radiation characteristic of the antenna 1 for a signal received in the antenna 1, as the reception directivity. That is, in this space distribution R1, a main beam of the antenna 1 is directed in a desired signal coming direction, and the reception directivity toward the interference wave source 4 is set to zero in cases where a reflected wave is transmitted from the interference wave source 4. Therefore, the reception of an interference wave, which comes from the interference wave source 4, in the antenna 1 of the base station can be prevented.

However, as shown in FIG. 9B, in the signal transmission from the base station to the mobile station, the directivity control of the adaptive antenna is performed for the antenna 1 of the base station to form the space distribution T2, which indicates the radiation characteristic of the antenna 1 for a signal transmitted from the antenna 1, as the transmission directivity. That is, the space distribution T2 is determined by multiplying the space distribution R1, which indicates the reception directivity of the antenna 1, by an assumed weighting factor. Therefore, in this space distribution T2 indicating the transmission directivity of the antenna 1, a main beam of the antenna 1 is directed in a desired signal transmitting direction, and the transmission directivity toward the interference wave source 4 is set to zero. In this case, though no signal is transmitted from the antenna 1 of the base station to the interference wave source 4, because a signal is output from the interference wave source 4 as an interference wave, the interference wave output from the interference wave source 4 is received in the antenna 2 of the mobile station. Therefore, a communication quality in the conventional mobile communication system cannot be maintained.

As is described above, because the conventional mobile communication system has the above configuration, in cases where an antenna of a second mobile station functions as the interference wave source 4, the interference wave output from the interference wave source 4 is received in the antenna 2 of the mobile station in the signal transmission from the base station to the mobile station. Therefore, there is a problem that a communication quality in the conventional mobile communication system cannot be maintained.

Also, because the directivity control of the adaptive antenna is performed for the antenna 1 of the base station in both the signal reception operation and the signal transmission operation performed in the base station, there is another problem that a calculation processing of the directivity control performed in the base station is complicated.

SUMMARY OF THE INVENTION

An object of the present invention is to provide, with due consideration to the drawbacks of the conventional mobile communication system, a mobile communication system in which a communication quality in the communication between a base station and a mobile station is maintained even though another mobile station functions as an interference wave source and in which an amount of calculation processing in the base station is reduced. Also, the object of the present invention is to provide a communication method performed in the mobile communication system.

The object is achieved by the provision of a mobile communication system comprising an antenna of a base station for performing a directivity control of an adaptive antenna in a signal reception of the base station to obtain a radiation characteristic of the antenna in which a main beam is directed in a desired signal coming direction and in which a directivity in a direction of an interference wave source is set to zero, and an antenna of a mobile station for performing the directivity control of the adaptive antenna in a signal reception of the mobile station to obtain a radiation characteristic of the antenna of the mobile station in which a main beam is directed in a desired signal coming direction and in which a directivity in a direction of the interference wave source is set to zero.

In the above configuration, in cases where a second mobile station functions as the interference wave source, an interference wave is transmitted from the interference wave source to the antenna of the mobile station in the signal reception of the mobile station. However, because the directivity of the antenna of the mobile station in the direction of the interference wave source is set to zero, the interference wave is not received in the antenna of the mobile station.

Accordingly, even though a second mobile station functions as the interference wave source, the reception of the interference wave output from the interference wave source can be prevented in both the antenna of the base station and the antenna of the mobile station, and a high communication quality in both the base station and the mobile station can be maintained.

Also, because no directive control is performed for the antenna of the base station in a signal transmission of the base station, an amount of calculation processing required in the base station can be reduced, a processor arranged in the base station can be simplified, and an electric power consumed in the base station can be reduced.

The object is achieved by the provision of a communication method of a mobile communication system comprising the steps of performing a directivity control of an adaptive antenna for an antenna of a base station in a signal reception of the base station to obtain a radiation characteristic of the antenna in which a main beam is directed in a desired signal coming direction and in which a directivity in a direction of an interference wave source is set to zero, and performing the directivity control of the adaptive antenna for an antenna of a mobile station in a signal reception of the mobile station to obtain a radiation characteristic of the antenna of the mobile station in which a main beam is directed in a desired signal coming direction and in which a directivity in a direction of the interference wave source is set to zero.

Accordingly, even though a second mobile station functions as the interference wave source, the reception of an interference wave output from the interference wave source can be prevented in both the antenna of the base station and the antenna of the mobile station, and a high communication quality in both the base station and the mobile station can be maintained.

Also, because no directive control is performed for the antenna of the base station in a signal transmission of the base station, an amount of calculation processing required in the base station can be reduced, a processor arranged in the base station can be simplified, and an electric power consumed in the base station can be reduced.

It is preferred that the communication method further comprises the step of performing a directivity synthesizing control for the antenna of the base station in a signal transmission of the base station to obtain another radiation characteristic of the antenna of the base station in which the main beam is directed in the same desired signal coming direction as that in the signal reception of the base station.

Accordingly, a gain for a signal output from the antenna of the base station according to the directivity of the antenna of the base station is increased, and a desired signal can be transmitted from the base station to the mobile station even though the mobile station is placed far away from the base station. Also, an area of a plurality of mobile stations, with which one base station communicates, can be widened.

It is preferred that the communication method further comprises the step of performing a diversity control for the antenna of the mobile station in a signal transmission of the mobile station to select one adaptive antenna, in which an electric power of a received signal is high, from a plurality of adaptive antennas composing the antenna of the mobile station and to transmit a signal from the selected adaptive antenna.

Accordingly, an electric power of a signal transmitted from the selected adaptive antenna to the base station can be increased, and an area of a plurality of mobile stations, with which one base station communicates, can be widened.

DETAILED DESCRIPTION OF THE PREFERRED EMBODIMENTS

Embodiments of the present invention will now be described with reference to the accompanying drawings.
Embodiment 1

Figure 1:
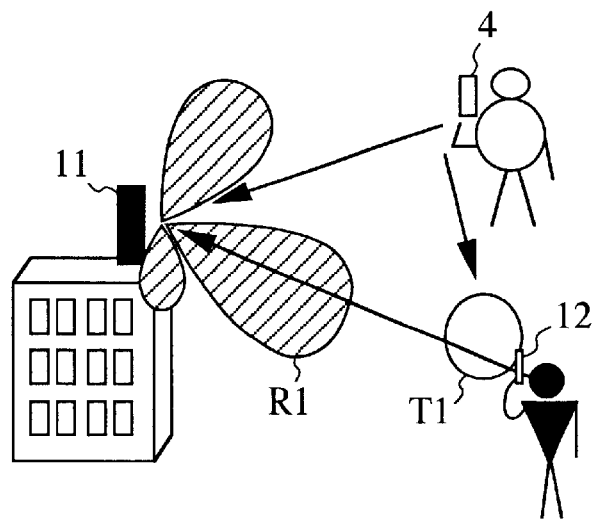
FIG. 1 is an explanatory view showing a signal transmission from a mobile station to a base station in a mobile communication system according to a first embodiment of the present invention.
Figure 2:
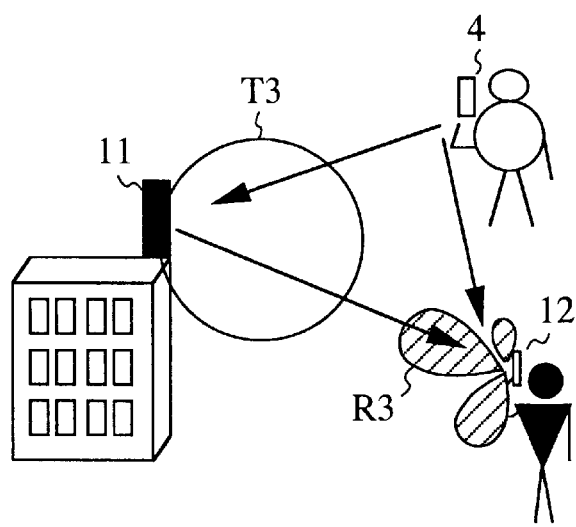
FIG. 2 is an explanatory view showing a signal reception in a mobile station in the mobile communication system according to the first embodiment of the present invention.

FIG. 1 is an explanatory view showing a signal transmission from a mobile station to a base station in a mobile communication system according to a first embodiment of the present invention, and FIG. 2 is an explanatory view showing a signal reception in a mobile station in the mobile communication system. In FIG. 1 and FIG. 2, 11 indicates an antenna of a base station. A directivity control of an adaptive antenna is performed for the antenna 11 of the base station in a signal reception operation of the base station. 12 indicates an antenna of a mobile station such as a portable telephone or a portable information terminal. A directivity control of an adaptive antenna is performed for the antenna 12 of the mobile station in a signal reception operation of the mobile station. 4 indicates an interference wave source, which indicates an antenna of a second mobile station such as a portable telephone or a portable information terminal.

Also, R1 denotes a space distribution indicating a radiation characteristic of the antenna 11 of the base station for a signal received in the antenna 11 of the base station, and T3 denotes a space distribution indicating a radiation characteristic of the antenna 11 of the base station for a signal received in the antenna 11 of the base station. T1 denotes a space distribution indicating a radiation characteristic of the antenna 12 of the mobile station for a signal transmitted from the antenna 12 of the mobile station, and R3 denotes a space distribution indicating a radiation characteristic of the antenna 12 of the mobile station for a signal received in the antenna 12 of the mobile station.

Next, an operation is described.

As shown in FIG. 1, in a signal transmission operation in which a desired signal is transmitted from the mobile station to the base station, a transmission directivity inherently held in the antenna 12 of the mobile station is used in the mobile station as it is, so that the space distribution T1 of the radiation characteristic of the antenna 12 is determined according to the transmission directivity. Therefore, a signal is transmitted from the antenna 12 of the mobile station according to the space distribution T1. In this case, because the space distribution T1 is uniform in all directions, the signal is equally transmitted in all directions.

In contrast, in the antenna 11 of the base station, a directivity control of an adaptive antenna is performed for the antenna 11 of the base station to form a space distribution R1, which indicates a radiation characteristic of the antenna 11 for a signal received in the antenna 11 of the base station, as a reception directivity of the antenna 11. In this space distribution R1 denoting the reception directivity of the antenna 11, a main beam of the antenna 11 is directed in a desired signal coming direction to receive a desired signal directly coming from the mobile station, and the reception directivity toward the interference wave source 4 is set to zero in cases where an antenna of a second mobile station functions as the interference wave source 4. In this case, even though a signal of the interference wave source 4 is transmitted to the antenna 11 of the base station as an interference wave, the reception of the interference wave in the antenna 11 of the base station can be prevented according to the space distribution R1 of the radiation characteristic of the antenna 11, and a desired signal directly coming from the antenna 12 of the mobile station is received in the antenna 11 at a high communication quality.

Also, as shown in FIG. 2, in a signal transmission operation in which a desired signal is transmitted from the base station to the mobile station, a transmission directivity inherently held in the antenna 11 of the base station is used in the base station as it is, so that a space distribution T3 indicating a radiation characteristic of the antenna 11 is formed according to the transmission directivity. Therefore, a desired signal is transmitted from the antenna 11 of the base station according to the space distribution T3. In this case, because the space distribution T3 is uniform in all directions, the signal is equally transmitted in all directions.

In contrast, as shown in FIG. 2, in the antenna 12 of the mobile station, a directivity control of an adaptive antenna is performed for the antenna 12 of the mobile station to form a space distribution R3, which indicates a radiation characteristic of the antenna 12 for a signal received in the antenna 12 of the mobile station, as a reception directivity of the antenna 12. In this space distribution R3 denoting the reception directivity of the antenna 12, a main beam of the antenna 12 is directed in a desired signal coming direction to receive a desired signal directly coming from the base station, and the reception directivity toward the interference wave source 4 is set to zero in cases where an antenna of a second mobile station functions as the interference wave source 4. In this case, even though an interference wave output from the interference wave source 4 is transmitted to the antenna 12 of the mobile station, the reception of the interference wave in the antenna 12 of the mobile station can be prevented. Also, a desired signal directly transmitted from the antenna 11 of the base station is received in the antenna 12 of the mobile station at a high communication quality according to the space distribution R3.

Accordingly, in the mobile communication system according to the first embodiment shown in FIG. 1 and FIG. 2, the directivity control of the adaptive antenna is performed for the antenna 11 of the base station in the signal reception of the base station, and the directivity control of the adaptive antenna is performed for the antenna 12 of the mobile station in the signal reception of the mobile station. Therefore, the reception of the interference wave in the antenna 11 of the base station can be prevented, the reception of the interference wave in the antenna 12 of the mobile station can be prevented, and a communication quality in both the base station and the mobile station can be improved in the communication between the base station and the mobile station.

As is described above, in the first embodiment, the transmission directivity, which is inherently held by the antenna 11 of the base station, is used in the base station as it is in the signal transmission from the antenna 11 of the base station, and the directivity control of the adaptive antenna is performed for the antenna 11 of the base station when a signal is received in the antenna 11 of the base station. Also, the transmission directivity, which is inherently held by the antenna 12 of the mobile station, is used in the mobile station as it is in the signal transmission from the antenna 12 of the mobile station, and the directivity control of the adaptive antenna is performed for the antenna 12 of the mobile station when a signal is received in the antenna 12 of the mobile station. Therefore, even though an antenna of a second mobile station functions as the interference wave source 4, the reception of an interference wave output from the interference wave source 4 can be prevented in both the antenna 11 of the base station and the antenna 12 of the mobile station. Accordingly, as compared with the conventional mobile communication system and the conventional communication method in which the directivity control of the adaptive antenna is performed for the antenna 11 of the base station in both the signal reception and transmission in/from the antenna 11 of the base station, a high communication quality in both the base station and the mobile station can be maintained in the communication between the base station and the mobile station.

Also, because no directivity control of the adaptive antenna is performed for the antenna 11 of the base station in the signal transmission from the antenna 11 of the base station, an amount of calculation processing required in the base station is reduced. Therefore, a processor of the base station can be simplified, and an electric power consumed in the base station can be reduced.

Embodiment 2

Figure 3:
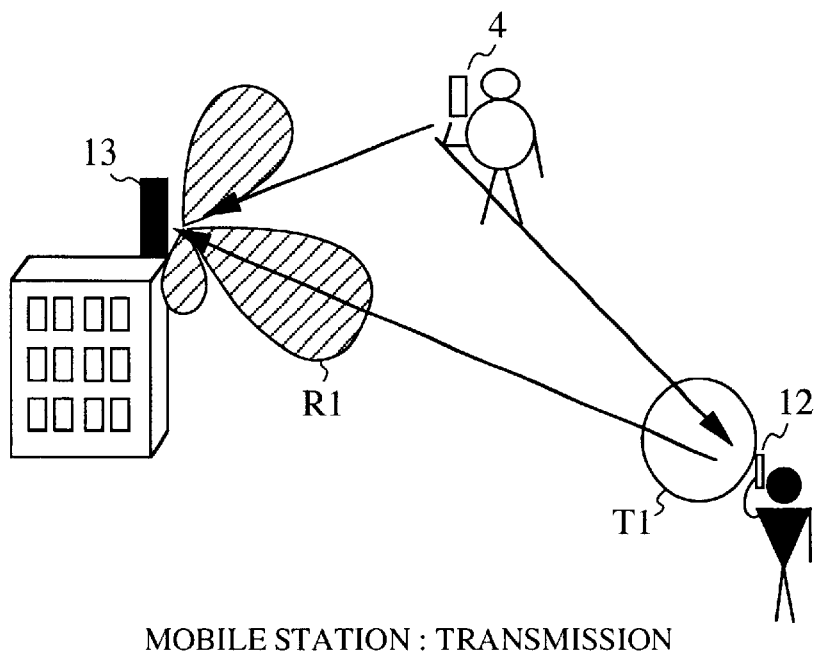
FIG. 3 is an explanatory view showing a signal transmission from a mobile station to a base station in a mobile communication system according to a second embodiment of the present invention.
Figure 4:
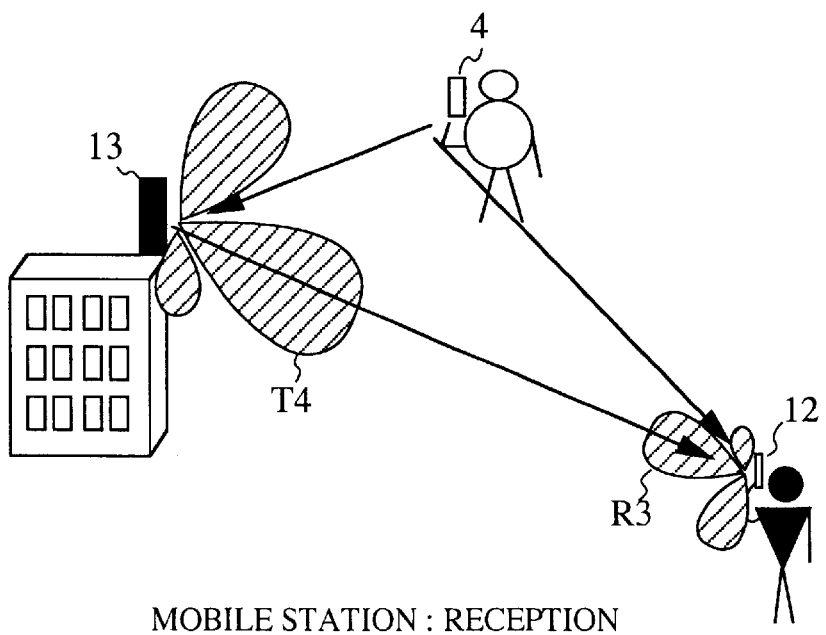
FIG. 4 is an explanatory view showing a signal reception in a mobile station in the mobile communication system according to the second embodiment of the present invention.

FIG. 3 is an explanatory view showing a signal transmission from a mobile station to a base station in a mobile communication system according to a second embodiment of the present invention, and FIG. 4 is an explanatory view showing a signal reception in a mobile station in the mobile communication system. In FIG. 3 and FIG. 4, 13 indicates an antenna of a base station. A directivity control of an adaptive antenna is performed for the antenna 13 of the base station in a signal reception operation of the base station. Also, a directivity synthesizing control is performed for the antenna 13 of the base station in a signal transmission operation of the base station to direct a main beam of the antenna 13 of the base station in the same desired signal coming direction as that in the signal transmission from the mobile station. T4 denotes a space distribution indicating a radiation characteristic of the antenna 13 for a signal transmitted from the antenna 13 of the base station. The other configuration is the same as that of the mobile communication system according to the first embodiment, so that the description of the other configuration is omitted.

Next, an operation is described.

As shown in FIG. 3, a directivity control of an adaptive antenna is performed for the antenna 13 of the base station in a signal reception operation of the base station in the same manner as the directivity control for the antenna 11 of the base station performed in the first embodiment. Therefore, the reception of an interference wave output from the interference wave source 4 is prevented in the base station.

Also, as shown in FIG. 4, a directivity synthesizing control is performed for the antenna 13 of the base station in a signal transmission operation of the base station to form a space distribution T4, which indicates a radiation characteristic of the antenna 13 for a signal transmitted from the antenna 13 of the base station, as a transmission directivity of the antenna 13. In this space distribution T4 denoting the transmission directivity of the antenna 13, a main beam of the antenna 13 is directed in the same desired signal coming direction as that in the signal transmission from the mobile station to directly transmit a desired signal to the mobile station. Because the main beam of the antenna 13 in the space distribution T4 is directed in the desired signal coming direction, a gain for a signal output from the antenna 13 of the base station according to the transmission directivity is increased. Therefore, a desired signal can be transmitted from the base station to the mobile station even though the mobile station is placed further away from the base station as compared with in the first embodiment.

Also, a directivity control of an adaptive antenna is performed for the antenna 12 of the mobile station in a signal reception operation of the mobile station in the same manner as in the first embodiment. Therefore, the reception of an interference wave output from the interference wave source 4 is prevented in the mobile station.

As is described above, in the mobile communication system and the communication method of this system shown in FIG. 3 and FIG. 4, the directivity control of the adaptive antenna is performed for the antenna 13 of the base station in the signal reception operation of the base station, and the directivity control of the adaptive antenna is performed for the antenna 12 of the mobile station in the signal reception operation of the mobile station. Accordingly, the reception of the interference wave in the antenna 13 of the base station can be prevented, the reception of the interference wave in the antenna 12 of the mobile station can be prevented, and a communication quality in both the base station and the mobile station can be improved in the communication between the base station and the mobile station.

Also, because the directivity synthesizing control is performed for the antenna 13 of the base station in the signal transmission operation of the base station, a gain for a signal output from the antenna 13 of the base station according to the transmission directivity of the antenna 13 is increased, and a desired signal can be transmitted from the base station to the mobile station even though the mobile station is placed further away from the base station as compared with in the first embodiment.

In conclusion, in the second embodiment, in addition to the configuration of the first embodiment, the directivity synthesizing control is performed for the antenna 13 of the base station in the signal transmission operation of the base station. Accordingly, in addition to the effect obtained in the first embodiment, a gain for a signal output from the antenna 13 of the base station according to the transmission directivity of the antenna 13 is increased, and a desired signal can be transmitted from the base station to the mobile station placed further away from the base station. That is, an area of a plurality of mobile stations, with which one base station communicates, can be widened. Also, in the signal transmission operation of the base station, because a calculation processing of an adaptive antenna for directing the main beam of the antenna 13 in the desired signal coming direction is only performed in the directivity synthesizing control, the calculation processing is not complicated as compared with that in the prior art.

Embodiment 3

Figure 5:
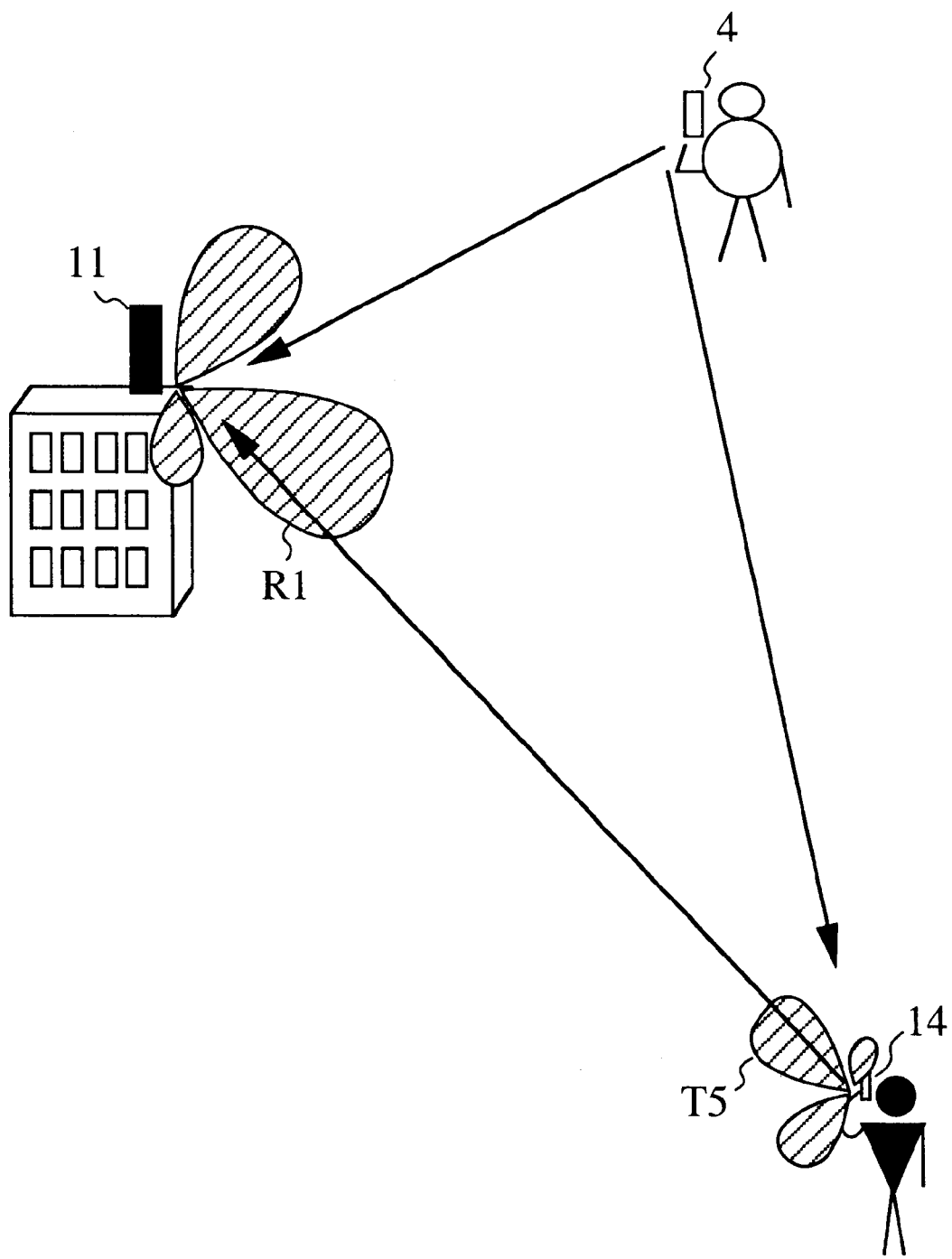
FIG. 5 is an explanatory view showing a signal transmission from a mobile station to a base station in a mobile communication system according to a third embodiment of the present invention.
Figure 6:
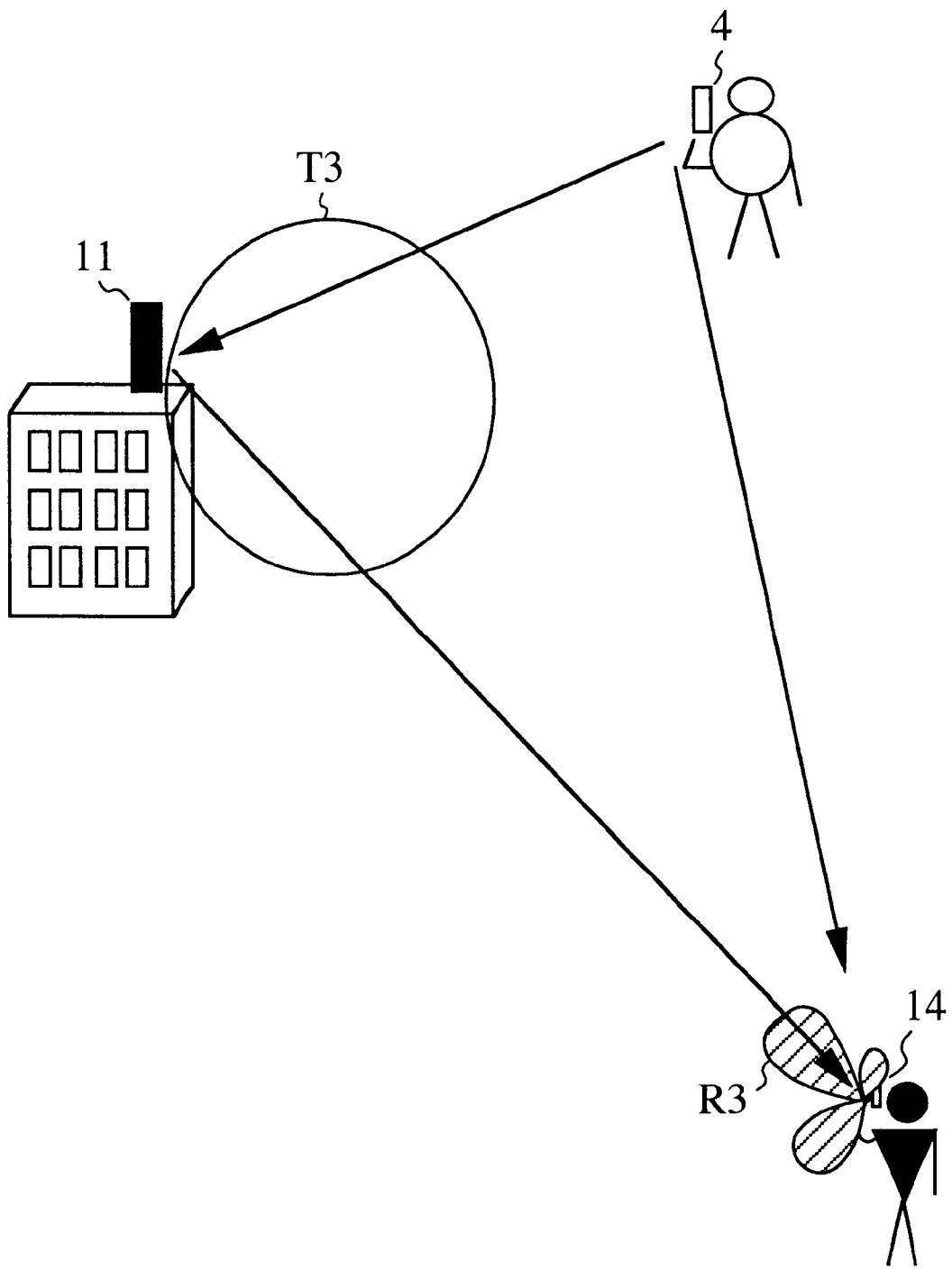
FIG. 6 is an explanatory view showing a signal reception in a mobile station in the mobile communication system according to the third embodiment of the present invention.
Figure 7:
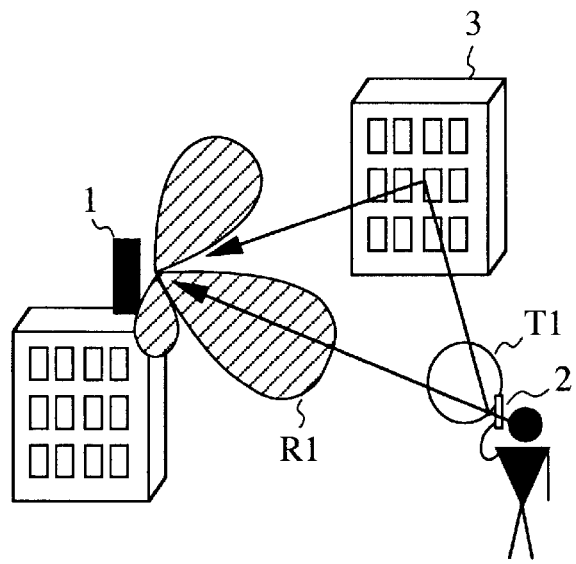
FIG. 7 is an explanatory view showing a signal transmission from a mobile station to a base station in a conventional mobile communication system.
Figure 8:
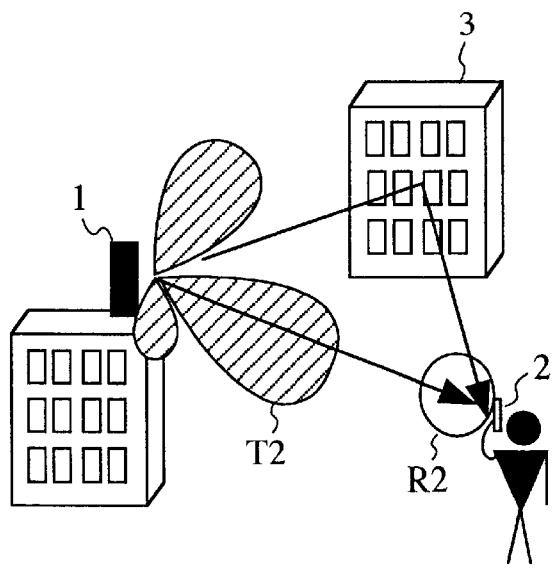
FIG. 8 is an explanatory view showing a signal reception in a mobile station in the conventional mobile communication system.
Figure 9A:
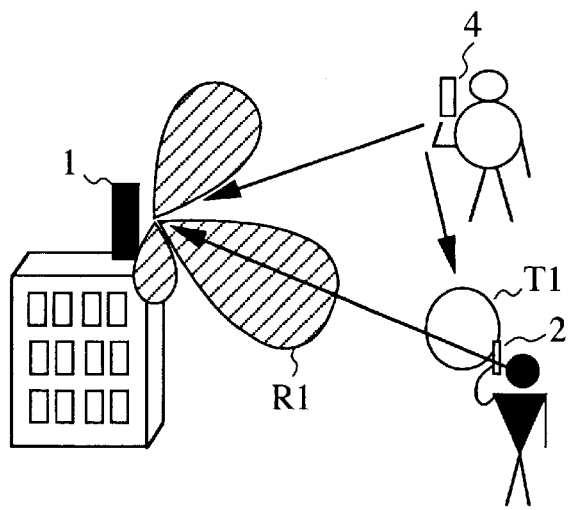
FIG. 9A is another explanatory view showing a signal transmission from a mobile station to a base station in the conventional mobile communication system.
Figure 9B:
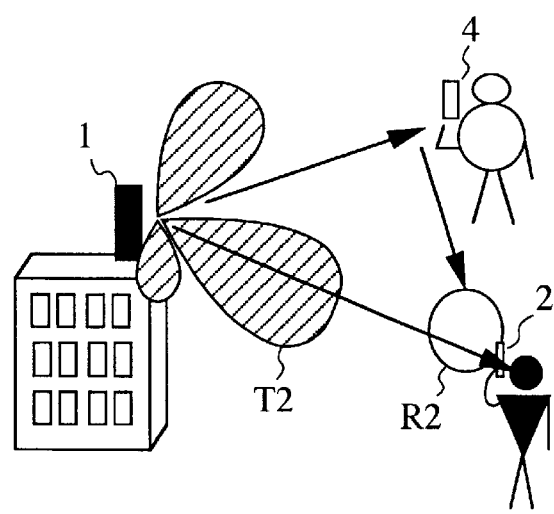
FIG. 9B is another explanatory view showing a signal reception in a mobile station in the conventional mobile communication system.

FIG. 5 is an explanatory view showing a signal transmission from a mobile station to a base station in a mobile communication system according to a third embodiment of the present invention, and FIG. 6 is an explanatory view showing a signal reception in a mobile station in the mobile communication system. In FIG. 5 and FIG. 6, 14 indicates an antenna of a mobile station such as a portable telephone or a portable information terminal. The antenna 14 of the mobile station is composed of a plurality of adaptive antennas, and a directivity control of an adaptive antenna is performed for the adaptive antennas 14 in a signal reception operation of the mobile station. Also, a diversity control is performed for the antenna 14 of the mobile station in a signal transmission operation of the mobile station. In this diversity control, one adaptive antenna, in which an electric power of a received signal is high in the signal reception operation, is selected from the adaptive antennas composing the antenna 14 of the mobile station to transmit a signal from the selected adaptive antenna of the mobile station.

Also, T5 denotes a space distribution indicating a radiation characteristic of the antenna 14 of the mobile station in the signal transmission from the antenna 14 of the mobile station.

The other configuration is the same as that of the mobile communication system according to the first embodiment, so that the description of the other configuration is omitted.

Next, an operation is described.

As shown in FIG. 6, in a signal transmission from the base station to the mobile station, a directivity control of an adaptive antenna is performed, in the same manner as that performed for the antenna 12 of the mobile station in the first embodiment, for the antenna 14 of the mobile station to form a space distribution R3, which indicates a radiation characteristic of the antenna 14 for a signal received in the antenna 14 of the mobile station, as a reception directivity of the antenna 14. In this space distribution R3 denoting the reception directivity of the antenna 14, a main beam of the antenna 14 is directed in a desired signal coming direction to receive a desired signal directly coming from the base station, and the reception directivity toward the interference wave source 4 is set to zero in cases where an antenna of a second mobile station functions as the interference wave source 4.

Thereafter, when a desired signal output from the antenna 11 of the base station is received in the antenna 14 of the mobile station, exciting amplitudes and phases of the desired signal received in the adaptive antennas composing the antenna 14 of the mobile station are controlled in the antenna 14 of the mobile station, and the reception of the interference wave output from the interference wave source 4 is prevented in the antenna 14 of the mobile station. In this case, control values for the exciting amplitudes and phases of the desired signal received in the adaptive antenna 14 are determined.

Therefore, the reception of the interference wave output from the interference wave source 4 can be prevented in the antenna 14 of the mobile station, and a desired signal directly transmitted from the antenna 11 of the base station is received in the antenna 14 of the mobile station at a high communication quality according to the space distribution R3.

Also, as shown in FIG. 5, in a signal transmission from the mobile station to the base station, a diversity control is performed for the antenna 14 of the mobile station to select one adaptive antenna, in which an electric power of the desired signal received from the base station is high, from the adaptive antennas composing the antenna 14 of the mobile station according to the control values determined in the signal reception of the antenna 14, and a desired signal is output from the selected adaptive antenna of the mobile station according to the space distribution T5 indicating a radiation characteristic of the antenna 14 of the mobile station.

Therefore, a gain for the desired signal output from the selected adaptive antenna of the mobile station is increased, and the desired signal can be reliably transmitted from the mobile station to the base station which is placed further away from the mobile station as compared with in the first embodiment.

Also, as shown in FIG. 5, a directivity control of an adaptive antenna is performed, in the same manner as in the first embodiment, for the antenna 11 of the base station to form the space distribution R1 as a reception directivity of the antenna 11. Therefore, the reception of the interference wave output from the interference wave source 4 can be prevented in the antenna 11 of the base station, and the desired signal directly coming from the antenna 14 of the mobile station is received in the antenna 11 at a high communication quality.

In the mobile communication system and the communication method of this system shown in FIG. 5 and FIG. 6, the directivity control of the adaptive antenna is performed for the antenna 11 of the base station in the signal reception operation of the base station, and the directivity control of the adaptive antenna is performed for the antenna 14 of the mobile station in the signal reception operation of the mobile station. Accordingly, the reception of the interference wave output from the interference wave source 4 can be prevented in the antenna 11 of the base station, the reception of the interference wave output from the interference wave source 4 can be prevented in the antenna 14 of the mobile station, and a communication quality can be improved in the communication between the base station and the mobile station.

Also, in the signal transmission from the mobile station to the base station, the diversity control is performed for the antenna 14 of the mobile station. Accordingly, an electric power of a signal directly output from the antenna 14 of the mobile station to the antenna 11 of the base station can be increased, and an area of a plurality of mobile stations, with which one base station communicates, can be widened.

As is described above, in the third embodiment, in addition to the configuration of the first embodiment, the diversity control is performed for the antenna 14 of the mobile station in the signal transmission operation of the mobile station. Accordingly, in addition to the effect obtained in the first embodiment, an electric power of a signal directly output from the antenna 14 of the mobile station to the antenna 11 of the base station can be increased, and an area of a plurality of mobile stations, with which one base station communicates, can be widened. In this diversity control performed for the antenna 14 of the mobile station in the signal transmission operation of the mobile station, one adaptive antenna, in which an electric power of a received signal is, for example, highest, is selected from the adaptive antennas composing the antenna 14 of the mobile station.

What is claimed is:

1. A mobile communication system comprising:

an antenna of a base station for performing a directivity control of an adaptive antenna in a signal reception of the base station to obtain a radiation characteristic of the antenna in which a main beam is directed in a desired signal coming direction and in which a directivity in a direction of an interference wave source is set to null; and an antenna of a mobile station for performing the directivity control of the adaptive antenna in a signal reception of the mobile station to obtain a radiation characteristic of the antenna of the mobile station in which a main beam is directed in a desired signal coming direction and in which a directivity in a direction of the interference wave source is set to null, wherein the directivity control of the adaptive antenna is not performed for the antenna of the base station when signal transmission is performed from the antenna of the base station.

2. A communication method of a mobile communication system comprising the steps of:

performing a directivity control of an adaptive antenna for an antenna of a base station in a signal reception of the base station to obtain a radiation characteristic of the antenna in which a main beam is directed in a desired signal coming direction and in which a directivity in a direction of an interference wave source is set to null; and performing the directivity control of the adaptive antenna for an antenna of a mobile station in a signal reception of the mobile station to obtain a radiation characteristic of the antenna of the mobile station in which a main beam is directed in a desired signal coming direction and in which a directivity in a direction of the interference wave source is set to null, wherein the directivity control of the adaptive antenna is not performed for the antenna of the base station when signal transmission is performed from the antenna of the base station.

3. A communication method of a mobile communication system according to claim 2, further comprising the step of performing a diversity control for the antenna of the mobile station in a signal transmission of the mobile station to select one adaptive antenna, in which an electric power of a received signal is high, from a plurality of adaptive antennas composing the antenna of the mobile station and to transmit a signal from the selected adaptive antenna.

* * * * *